United States Patent [19]

Kushimoto et al.

[11] Patent Number: 5,524,482

[45] Date of Patent: *Jun. 11, 1996

[54] DETECTING A DEFLATED VEHICLE TIRE BY COMPARING ANGULAR VELOCITY DATA OF ALL WHEELS, A DATA TABLE, AND THE DIRECTLY-MEASURED PRESSURE OF A SINGLE TIRE

[75] Inventors: Yoshikazu Kushimoto, Kakogawa; Minao Yanase, Kobe, both of Japan

[73] Assignee: Sumitomo Rubber Industries, Ltd., Hyogo-ken, Japan

[*] Notice: The term of this patent shall not extend beyond the expiration date of Pat. No. 5,483,220.

[21] Appl. No.: 504,546

[22] Filed: Jul. 20, 1995

Related U.S. Application Data

[62] Division of Ser. No. 170,775, Dec. 21, 1993, Pat. No. 5,483,220.

[30] Foreign Application Priority Data

Dec. 24, 1992 [JP] Japan ................................. 4-344104
Dec. 28, 1992 [JP] Japan ................................. 4-347669

[51] Int. Cl.$^6$ ............................................. B60C 23/02
[52] U.S. Cl. .................... 73/146.3; 73/146.2; 340/444
[58] Field of Search ......................... 73/146.2, 146.3, 73/146.4, 146.5, 146.8; 340/444

[56] References Cited

U.S. PATENT DOCUMENTS

3,691,524  9/1972  Frost et al. .
5,248,957  9/1993  Walker et al. .

FOREIGN PATENT DOCUMENTS

0083771  7/1983  European Pat. Off. .
0291217  11/1988  European Pat. Off. .
2271063  5/1974  France .
1434290  10/1988  U.S.S.R. ........................... 73/146.3
1643965  4/1991  U.S.S.R. ........................... 73/146.3

Primary Examiner—Richard Chilcot
Assistant Examiner—Joseph L. Felber
Attorney, Agent, or Firm—Birch, Stewart, Kolasch & Birch

[57] ABSTRACT

A method for detecting a deflated condition of a tire, comprises the steps of: detecting the angular velocity of each wheel, producing a signal proportional to the angular velocity detected, directly detecting the pneumatic pressure of a tire for only one wheel, producing a signal proportional to the pneumatic pressure detected, and arithmetically processing the signals produced in the preceding steps. A device to which this method is applied is also disclosed.

7 Claims, 1 Drawing Sheet

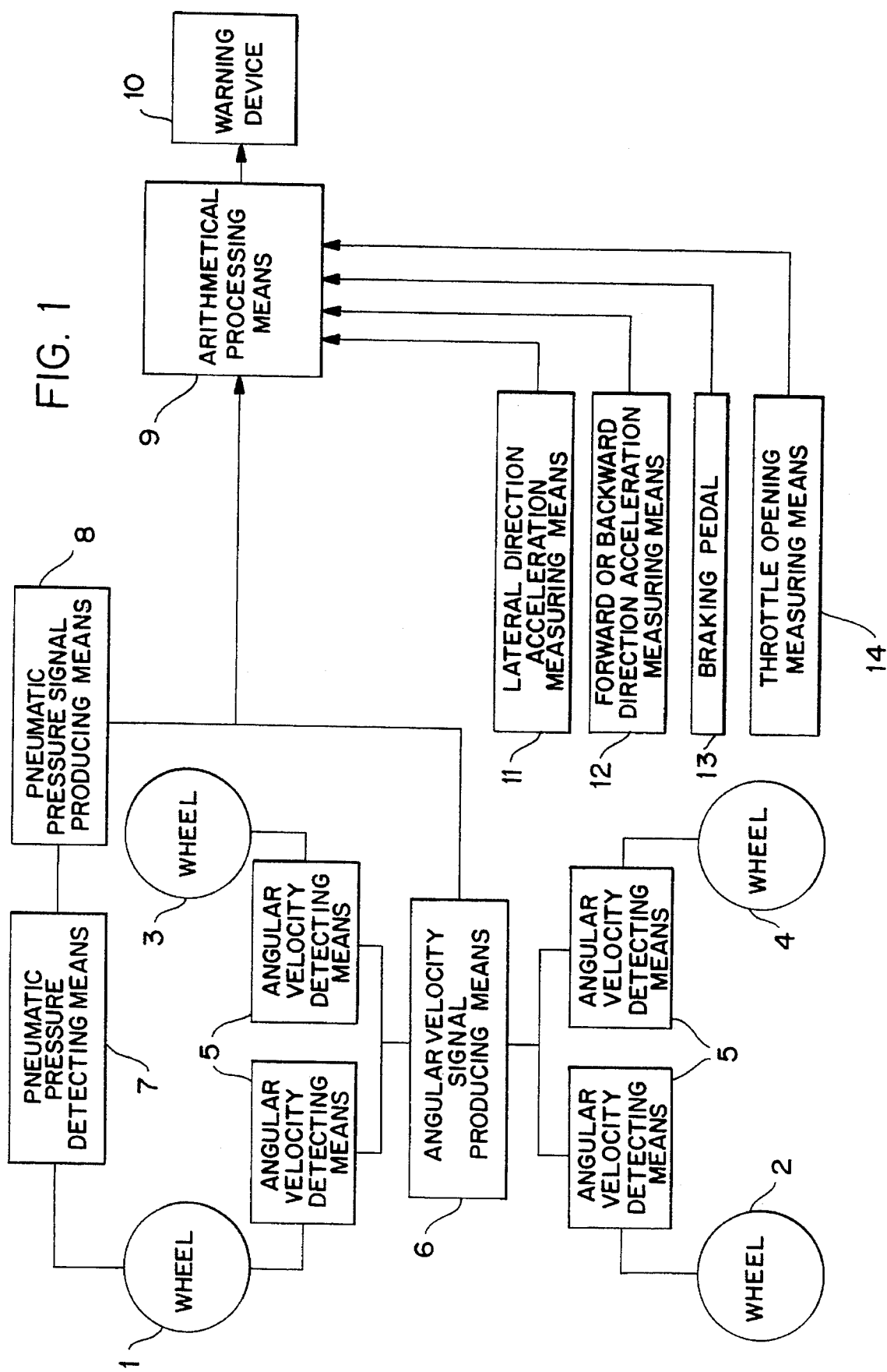

DETECTING A DEFLATED VEHICLE TIRE BY COMPARING ANGULAR VELOCITY DATA OF ALL WHEELS, A DATA TABLE, AND THE DIRECTLY-MEASURED PRESSURE OF A SINGLE TIRE This application is a divisional of application Ser. No. 08/170,775, filed on Dec. 21, 1993, now U.S. Pat. No. 5,483,220, the entire contents of which are hereby incorporated by reference.

BACKGROUND OF THE INVENTION

The present invention relates to a method and a device for detecting a deflated condition of a tire on a vehicle such as a car or a truck. More particularly, the invention relates to a method and a device capable of reducing cost by the use of wheel speed pulse in an ABS (Anti-lock Braking System) and of detecting simply and reliably simultaneous deflated condition of not less than two wheels at minimum increase of cost by installing a pneumatic pressure detector at a wheel.

Pneumatic pressure of tires greatly influences on the performance of vehicles, especially the deflation of tires has a close relation to safety for drivers. Hence, many systems for detecting a deflated condition of a tire have been proposed. However, these proposals could not realize both high reliability and low cost so that they have not been widely spread. Recently, with the spread of ABS, there has been proposed a system with low cost and high reliability wherein the wheel speed pulse in the ABS is utilized. Although the system reliable to a deflated condition of one tire, it is not reliable to simultaneous deflated condition of not less than two wheels.

In the meanwhile, the devices for detecting a deflated condition are classified into several types according to detection methods. One of the devices is of a tires which directly detects pneumatic pressure of tires and the other is of a type which detects physical quantity such as deflation amount or revolution number which changes with pneumatic pressure.

The former is more reliable than the latter while the device is complicated and expensive because transmission of signals from a rotating body to a static section is difficult. On the other hand, the latter is simple and cheap while it is less reliable than the former.

Also, in the systems for detecting a deflated condition on the basis of wheel speed, a deflated condition of a tire is generally determined by the comparison between the wheel speed pulse of the deflated pneumatic tire and that of the normal pneumatic tire. Accordingly, the pneumatic pressure of at least one tire must be normal, so that the simultaneous deflated condition of all wheels cannot be detected theoretically.

In view of the above state of the art, it is an object of the present invention to provide a method and a device for detecting a deflated condition of a tire for which the cost is low and which has high reliability and can detect simultaneous a deflated condition of all wheels on a vehicle.

SUMMARY OF THE INVENTION

In accordance with the present invention, there is provided a method for detecting a deflated condition of a tire on a vehicle, the method comprising the steps of:

(a) detecting the angular velocity of each wheel, (b) producing signals proportional to each of the detected angular velocities, (c) directly detecting pneumatic pressure of only one wheel of the vehicle, (d) producing a signal proportional to the detected pneumatic pressure, and (e) arithmetically processing the signals produced in steps (b) and (d)

wherein with respect to the directly detected pressure of one wheel, the step (e) comprises:

operating a device which warns of a deflated condition of a tire when a difference between the detected pneumatic pressure and a predetermined normal pneumatic pressure is not less than 0.3 kgf/cm$^2$; and wherein with respect to the other wheels, when the detected pneumatic pressure is normal, step (e) comprises:

obtaining ratios of respective angular velocities of the other wheels to an angular velocity of the one wheel for which pneumatic pressure was directly detected, comparing the obtained ratios with a ratio in a table of wheel angular velocity ratio under a normal condition on the basis of an angular velocity of the detected wheel in step (c), comparing the angular velocity of at least one other wheel and an average value of angular velocities of all the wheels, and operating, a device which warns of the deflated condition of a tire when the difference between the compared ratios ranges from 0.05% to 0.60% or when the difference between the angular velocity of the other wheel and an average value of angular velocities of all the wheels ranges from 0.05% to 0.60%.

Then, according to the method of the present invention, when the deflated condition of the directly detected wheel is warned, the method further comprises a step (f) of:

obtaining vehicle speed from a table wherein the relation between pneumatic pressure and angular velocity is shown, obtaining an angular velocity of the directly detected wheel under normal pneumatic pressure, corresponding to the obtained vehicle speed, and obtaining ratios of respective angular velocities of the other wheels to this angular velocity so that the deflated tire can be identified.

The method of the present invention preferably includes a step (g) of directly measuring and monitoring acceleration of the vehicle in a lateral direction, and a step (h) of invalidating the data of angular velocity of each wheel when an absolute value of the acceleration in the lateral direction exceeds 0.06 g (g: gravity).

Further, the method of the present invention, preferably includes a step (i) of directly measuring and monitoring acceleration of a vehicle in a forward or backward direction, and a step (j) of invalidating the data of angular velocity of each wheel when an absolute value of the acceleration in the forward or backward direction exceeds 0.03 g.

Moreover, the method of the present invention includes a step (k) of invalidating the data of angular velocity of each wheel when a braking pedal is stepped on; or step (l) of measuring throttle opening, differentiating the measured value, and monitoring the differentiated value, and a step (m) of invalidating the data of angular velocity of each wheel when the differentiated value exceeds 100%/sec.

In accordance with the present invention, there is also provided a device for detecting a deflated condition of a tire on a vehicle comprising:

angular velocity detecting means for detecting an angular velocity of each wheel, angular velocity signal producing means for producing signals proportional to the detected angular velocities, pneumatic pressure detecting means for directly detecting only one wheel of the vehicle, pneumatic pressure signal producing means for producing a signal proportional to the obtained pneumatic pressure;

arithmetically processing means for arithmetically processing the signals from the angular velocity signal producing means and the pneumatic pressure signal producing means;

wherein with respect to the directly detected wheel, the arithmetically processing means operates a device which warns of the deflated condition of a tire when the difference between the detected pneumatic pressure and a predetermined normal pneumatic pressure is not less than 0.3 kgf/cm$^2$; and wherein with respect the to other wheels, when the detected pneumatic pressure is normal, the arithmetically processing means, obtains ratios of respective angular velocities of the other wheels to an angular velocity of the directly detected wheel, compares the obtained ratios with a ratio in a table of wheel angular velocity ratio under normal condition on the basis of the angular velocity of the directly detected wheel, compares the angular velocity of the other wheel and an average value of angular velocities of all the wheels, and operates a device which warns the pneumatic abnormality of tire when the difference between the compared ratios ranges from 0.05% to 0.60% or when the difference between the angular velocity of the other wheel and an average value of angular velocities of all the wheels ranges from 0.05% to 0.60%.

The device of the present invention preferably includes an identifying means wherein when pneumatic pressure of the directly detected wheel is abnormal, the means obtains vehicle speed from a table wherein the relation between pneumatic pressure and angular velocity is shown, obtains an angular velocity of the directly detected wheel under normal pneumatic pressure, corresponding to the obtained vehicle speed, and obtains ratios of respective angular velocities of the other wheels to this angular velocity so that the deflated tire can be identified.

The device of the present invention preferably includes means for directly measuring and monitoring acceleration of the vehicle in a lateral direction transverse to a forward or backward direction of the vehicle, and means for invalidating the data of angular velocity of each wheel when an absolute value of the acceleration in the lateral direction exceeds 0.06 g (g: gravity).

Further, the device of the present invention preferably includes means for directly measuring and monitoring acceleration of the vehicle in a forward or backward direction, and means for invalidating the data of angular velocity of each wheel when an absolute value of the acceleration in the forward or backward direction exceeds 0.03 g.

Moreover, the device of the present invention preferably includes means for invalidating the data of angular velocity of each wheel when a braking pedal is stepped on; or means for measuring throttle opening, differentiating the measured value, and monitoring the differentiated value, and means for invalidating the data of angular velocity of each wheel when the differentiated value exceeds 100%/sec.

According to the present invention, with respect to one of the wheels on a vehicle, deflation is detected by directly detecting the pneumatic pressure thereof, and for the other wheels, deflation is detected by a relative value of an angular velocity of each wheel to the angular velocity of the wheel for which pneumatic pressure was directly detected or an average value of angular velocities of all the wheels.

BRIEF DESCRIPTION OF THE DRAWING

FIG. 1 is a schematic view of the inventive device for the detection of a deflated condition of a tire.

FIG. 1 shows the elements: wheels 1, 2, 3, and 4; angular velocity detecting means 5; angular velocity signal producing means 6; pneumatic pressure detecting means 7; pneumatic pressure signal producing means 8; arithmetical processing means 9; warning device 10; lateral direction acceleration measuring means 11; forward or backward direction acceleration measuring means 12; braking pedal 13; and throttle opening measuring means 14.

DETAILED DESCRIPTION OF THE INVENTION

Described herebelow is a method for detecting pneumatic abnormalities of tire on a vehicle according to the present invention (hereinafter referred to detection method) in each step.

In step (a), angular velocity of rotation (hereinafter referred to angular velocity) of each wheel 1, 2, 3, 4 is detected from vehicle speed pulses produced in an ABS by using angular velocity detecting means 5 such as a pulse counter. In step (b), signals proportional to the angular velocities are produced by using angular velocity signal producing means 6 such as a digital-to-analog (D/A) converter, and the angular velocity of each wheel is always monitored.

In step (c), a pneumatic pressure detecting means 7 such as pressure transducer and the like is mounted on one of all the wheels to obtain the pneumatic pressure. In step (d), a signal proportional to the pneumatic pressure is produced by a pneumatic pressure signal producing means 8 through the use of direct current amplifier and the like to be always monitored.

In step (e), at first the pneumatic pressure of wheel A monitored in step (d) (the wheel on which the pneumatic detecting means is mounted is defined as wheel A) is compared with a predetermined normal value using an arithmetic processing means 9. If the difference between the detected pneumatic pressure and a normal value is not less than 0.3 kgf/cm$^2$, a warning device 10 of a deflated condition is operated. Since a pneumatic pressure of wheel A is directly detected, deflation of any pair of the wheels including wheel A, including deflation of all the wheels, are detected and warned. Table 1 shows the dependency of angular velocities of the tire (wheel A) on pneumatic pressure and speed.

TABLE I

| Pneumatic pressure | Speed | | | | | |
|---|---|---|---|---|---|---|
| | 20 (km/h) | 40 (km/h) | 60 (km/h) | 80 (km/h) | 100 (km/h) | 120 (km/h) |
| 3.0 (kg/cm$^2$) | 8.8680 (rad/sec) | 17.7340 | 26.5994 | 35.4537 | 44.2984 | 53.1033 |
| 2.6 (kg/cm$^2$) | 8.8737 | 17.7436 | 26.6124 | 35.4675 | 44.3191 | 53.1361 |
| 2.3 (kg/cm$^2$) | 8.8816 | 17.7595 | 26.6364 | 35.4993 | 44.3544 | 53.1715 |
| 2.0 (kg/cm$^2$) | 8.8940 | 17.7835 | 26.6692 | 35.5402 | 44.4018 | 53.2213 |
| 1.7 (kg/cm$^2$) | 8.9093 | 17.8121 | 26.7077 | 35.5889 | 44.4574 | 53.2811 |
| 1.4 (kg/cm$^2$) | 8.9208 | 17.8351 | 26.7409 | 35.6282 | 44.5026 | 53.3238 |
| 1.0 (kg/cm$^2$) | 8.9358 | 17.8600 | 26.7765 | 35.6724 | 44.5596 | 53.4004 |

When deflation of wheel A is not detected, ratios of angular velocity of wheel A detected in step (a) to the respective angular velocities of the other wheels are obtained. The ratios are compared with the value in a table and the device warns of a deflated condition of a tire when the difference between the compared ratios ranges from 0.05% to 0.60%. Further, an average value of angular velocity of all the wheels detected in the step (a) is obtained and compared with the respective angular velocities of the other wheels. The device preferably warns of a deflated condition of a tire when the difference ranges from 0.05% to 0.60%. Thus, all deflation of any pair of the wheels except wheel A are detected and warned.

Warning can be performed by using buzzers and the like which appeal to the ears or by using lamps and the like which appeal to the eyes.

In step (e), there is required a table wherein velocity pitch is fixed and ratios of angular velocity of each wheel to normal angular velocity of wheel A at each range of the pitch are shown. Such table can be prepared by driving on a straight course at each specific speed under normal pneumatic pressure and obtaining ratios of angular velocities at each specific speed. An examples of such table is Table II. Pneumatic pressure detection means is mounted on a front left wheel in Table II. Velocity pitch means an interval between velocities at which angular velocity ratio (ratio of angular velocity of each wheel to normal angular velocity of wheel A) is obtained. In Table II, ratios of angular velocity are obtained at intervals of 20 km/h (20 km/h pitch). Though a table could just as easily be obtained at 10 km/h pitch or 5 km/h pitch.

TABLE II

| | 20 (km/h) | 40 (km/h) | 60 (km/h) | 80 (km/h) | 100 (km/h) | 120 (km/h) |
|---|---|---|---|---|---|---|
| Front Left wheel | 1.00000 | 1.00000 | 1.00000 | 1.00000 | 1.00000 | 1.00000 |
| Front Right wheel | 1.00151 | 1.00151 | 1.00152 | 1.00152 | 1.00153 | 1.00153 |
| Rear Left wheel | 0.99783 | 0.99776 | 0.99767 | 0.99756 | 0.99745 | 0.99732 |
| Rear Right wheel | 0.99933 | 0.99927 | 0.99918 | 0.99908 | 0.99898 | 0.99885 |

As described above, according to the present invention, deflation of any pair of the wheels, including deflation of all the four wheels, can be detected. When deflation is detected, judgment of deflated wheel(s) is performed by combinationally using Table I and Table II. An embodiment is shown as follows when the pneumatic pressure of wheel A under normal condition is 2.0 kgf/cm$^2$.

At first, pneumatic pressure is measured with a pressure transducer and the like, and the measured value is compared with a predetermined normal value so that it is judged whether wheel A is normal or not.

1) When pneumatic pressure of wheel A is normal, vehicle speed is obtained from Table I by using a pneumatic pressure of wheel A detected in step (c) and an angular velocity of wheel A detected in the step (a). Then, a ratio of angular velocity of each wheel (except for the wheel A) to that of the wheel A under a normal condition at the speed is obtained from Table II.

The angular velocity of each wheel detected in step (a) is divided by an angular velocity of wheel A then, the obtained ratio is compared with the ratio of angular velocity of each wheel under a normal condition so that it is judged whether the inflation of each wheel is normal or not.

2) When pneumatic pressure of wheel A is abnormal, vehicle speed is obtained from Table I by using a pneumatic pressure of wheel A detected in step (c) and an angular velocity of wheel A detected in step (a). Then, a ratio of angular velocity of each wheel under normal condition at the speed is obtained in Table II.

An angular velocity is obtained from Table I at the vehicle speed obtained as stated above when pneumatic pressure of wheel A is normal (2.0 kgf/cm$^2$). The angular velocity of each wheel detected in step (a) is divided by this angular velocity of wheel A. Then the obtained ratio is compared with the ratio of angular velocity of each wheel under normal condition so that it is judged whether each wheel is normal or not.

An angular velocity detected in step (a) changes with causes except deflation of tire, that is turning, acceleration or speed reduction and the like, which makes a device warning of a deflated condition of a tire operate wrongly. A method and a device for detecting a deflated condition of a tire of the present invention, including a method and a device preventing such wrong warning, is described herebelow.

In this method for eliminating abnormal values, the determination of turning and, acceleration or deceleration of a vehicle is performed, not by calculating angular velocity of each tire, but directly measuring accelerations of a vehicle in the lateral direction and in the forward or backward direction, whereby abnormal values can be surely eliminated.

In the step (g), acceleration of a vehicle in the lateral direction, transverse to the forward or backward direction, is measured with a lateral direction acceleration sensor 11 mounted on a vehicle to be monitored with a microcomputer and the like. As a lateral acceleration sensor, for example, a piezo-electric acceleration transducer or a strain gauge acceleration transducer and the like can be used. These sensors can directly measure the acceleration of the vehicle in the lateral direction without using information from tire such as angular velocity of each tire. Hence, the acceleration in the lateral direction can be measured accurately, irrelevant to the status of the tires.

On the other hand, angular velocity of each tire is measured with a rotation pulse generator and the like to be always monitored by a microcomputer and the like.

In the step (h), the data of angular velocity of each wheel is automatically eliminated by using a microcomputer and the like when the acceleration in the lateral direction exceeds 0.06 g so that deflation of tires are detected by using the data which are not eliminated. When the acceleration in the lateral direction exceeds 0.06 g, the obtained data cannot be used because a cause except deflation of tire, that is, turning of the vehicle makes differences in angular velocity between the inner wheel and the outer wheel, which makes a warning device operate incorrectly.

Instead of acceleration in the lateral direction, it is also preferable that in a step (i), acceleration of a vehicle in a forward or backward direction is measured with a forward-backward acceleration measuring means 12 mounted on a vehicle and is always monitored with a microcomputer and the like. As a forward-backward acceleration means, for example, a piezo-electric acceleration transducer or strain gauge acceleration transducer can be used. These sensors can directly measure acceleration of a vehicle in the forward or backward direction without using information from tires such as angular velocity of tire. Hence, the acceleration in the forward or backward direction can be measured accurately, irrelevant to the status of the tires.

Then, in the step (j), the data of angular velocity of each wheel is automatically eliminated by using a microcomputer and the like when the acceleration in the forward or backward direction exceeds 0.03 g so that deflation of the tires are detected by using the data which are not eliminated. When the acceleration in the forward or backward direction exceeds 0.03 g, the obtained data cannot be used because, causes except deflation of tire, that is, tire slips caused by driving or braking make differences among the angular velocities of the tires.

Further, in the step (k), it is preferable that the data of angular velocity of each wheel is automatically eliminated by using a microcomputer and the like when a braking pedal 13 is stepped on. When the braking pedal is stepped on, the obtained data cannot be used because tire slip caused by braking makes differences among the angular velocities of the tires.

Also, as another method, in a step (l), throttle opening is measured with a throttle opening measuring means 14 such as a throttle sensor. The measured value is differentiated by using a differentiating circuit, a microcomputer and the like and is always monitored with a microcomputer and the like. Then, in a step (m), when a differentiated value exceeds 100%/sec., it is preferable that the data of angular velocity of each tire is automatically eliminated by using a microcomputer and the like. When the differentiated value exceeds 100%/sec., the obtained data cannot be used because tire slip makes difference among the angular velocities of tires, which makes the warning device operate wrongly. As a practical matter, when a driver steps on a accelerator to suddenly accelerate the vehicle, the electrical signal increases sharply. Thus, when an output of 1 volt is detected when an accelerator is fully stepped on (throttle opening is 100%), if there is detected a voltage increase speed of not less than 1 volt per 1 minute, such sudden voltage increase speed is considered to be "sudden acceleration" of the vehicle so that the obtained data is invalidated.

Besides by using the above ways individually, it is preferable to adequately combine two or three ways among the above ways, and also preferable to use all the four ways. Thus, the abnormal values can be eliminated more accurately than by using the ways individually.

According to the above ways, condition for eliminating abnormal values such as vehicle acceleration can be directly obtained without the use of information from the tire so that the abnormal value can be eliminated as irrelevant to status of tire.

The detection method of the present invention utilizes wheel pulses in the ABS so that the reliability of the method rises and the costs of the method are decreased. Deflation of only one of all the wheels is directly detected with pneumatic pressure detecting means, and deflation of the other wheels are detected by using a relative value of an angular velocity of each wheel to the angular velocity of the detected wheel or an average value of angular velocities of all the wheels. Consequently, direct detecting means is mounted on only one wheel, which saves cost of the device and prevents complication of the device, and the invention can accurately detect and warn of deflation of any pair of the wheels including deflation of all the wheels.

Though several embodiments of the present invention are described above, it is to be understood that the present invention is not limited only to the above-mentioned and various changes and modifications may be made in the invention without departing from the spirit and scope thereof.

What we claim is:

1. A method for detecting a deflation condition of a tire mounted on a wheel of a vehicle, comprising the steps of:

(a) detecting angular velocity of each wheel, (b) producing signals proportional to the detected angular velocities, (c) directly detecting pneumatic pressure of only one wheel of the vehicle, (d) producing a signal proportional to the detected pneumatic pressure, and (e) arithmetically processing the signals produced in the steps (b) and (d), wherein, with respect to the wheel of step (c), the step (e) comprises:

operating a device which warns of the deflation condition of the wheel of step (c) when a difference between the detected pneumatic pressure and a predetermined normal pneumatic pressure is not less than 0.3 kgf/cm$^2$;

and wherein, with respect to the other wheels, when the detected pneumatic pressure is normal, the step (e) comprises:

obtaining ratios of respective angular velocities of each of the other wheels to an angular velocity of the wheel of step (c), comparing the obtained ratios with ratios in a table of wheel angular velocity ratios under normal conditions on the basis of an angular velocity of the wheel in step (c), comparing the angular velocity of each of the other wheels and an average value of angular velocities of all the wheels, and operating a device which warns of the deflation condition of one of the other wheels when the difference between the compared ratios ranges from 0.05% to 0.60% or when the difference between the angular velocity of the one of the other wheels and an average value of angular velocities of all the wheels ranges from 0.05% to 0.60%.

2. The method of claim 1, wherein the method further comprises the step (f) of:

when the deflation condition of the wheel in step (c) is warned, obtaining vehicle speed from a table wherein the relation between pneumatic pressure, angular velocity, and said vehicle speed is shown, obtaining an angular velocity of the wheel in step (c) under normal pneumatic pressure, corresponding to said obtained vehicle speed, and obtaining ratios of respective angular velocities of the other wheels to said angular velocity of the wheel in step (c) under normal pneumatic pressure so that, with respect to the other wheels, under normal pneumatic pressure, a deflated tire can be identified.

3. The method of claim 1, wherein the method further includes the steps of:

(g) directly measuring and monitoring acceleration of a vehicle in a lateral direction, and (h) invalidating the data of angular velocity of each wheel when an absolute value of the acceleration in the lateral direction exceeds 0.06 g.

4. The method of claim 1, wherein the method further includes the steps of:

(i) directly measuring and monitoring acceleration of the vehicle in a forward or backward direction, and (j) invalidating the data of angular velocity of each wheel when an absolute value of the acceleration in the forward or backward direction exceeds 0.03 g.

5. The method of claim 1, wherein the method further includes of the step of:

(k) invalidating the data of angular velocity of each wheel when a braking pedal is stepped on.

6. The method of claim 1, wherein the method further includes the step of:

(l) measuring throttle opening as a proportion of maximum throttle opening, differentiating the measured values with respect to time and monitoring the differentiated value of throttle opening, and (m) invalidating the data of angular velocity of each wheel when the differentiated value exceeds 100%/sec.

7. The method of claim 1, wherein the method further includes the steps of:

(k) invalidating the data of angular velocity of each wheel when a braking pedal is actuated, (l) measuring throttle opening as a proportion of maximum throttle opening, differentiating the measured values with respect to time and monitoring the differentiated value of throttle opening, and (m) invalidating the data of angular velocity of each wheel when the differentiated value exceeds 100%/sec.

* * * * *